(12) United States Patent
Ogawa et al.

(10) Patent No.: US 12,275,334 B2
(45) Date of Patent: Apr. 15, 2025

(54) SOLAR CELL SYSTEM AND VEHICLE SYSTEM

(71) Applicant: KABUSHIKI KAISHA TOSHIBA, Tokyo (JP)

(72) Inventors: Kenichirou Ogawa, Kawasaki Kanagawa (JP); Tetsu Shijo, Tokyo (JP); Yasuhiro Kanekiyo, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 118 days.

(21) Appl. No.: 18/181,798

(22) Filed: Mar. 10, 2023

(65) Prior Publication Data

US 2024/0092181 A1    Mar. 21, 2024

(30) Foreign Application Priority Data

Sep. 15, 2022 (JP) ................... 2022-146937

(51) Int. Cl.
*B60L 8/00*  (2006.01)
*B60L 53/60*  (2019.01)

(52) U.S. Cl.
CPC ............... *B60L 8/003* (2013.01); *B60L 53/60* (2019.02); *B60L 2210/10* (2013.01)

(58) Field of Classification Search
CPC ....... B60L 8/003; B60L 53/60; B60L 2210/10
USPC .................................. 307/10.1, 9.1
See application file for complete search history.

(56) References Cited

U.S. PATENT DOCUMENTS

| | | | |
|---|---|---|---|
| 2015/0268687 A1* | 9/2015 | Miyoshi | G05F 1/67 701/36 |
| 2021/0101486 A1* | 4/2021 | Hill | H02S 40/20 |
| 2022/0247204 A1* | 8/2022 | Pahlevaninezhad | H02S 40/38 |
| 2023/0402665 A1* | 12/2023 | Han | H02J 7/35 |

FOREIGN PATENT DOCUMENTS

| | | |
|---|---|---|
| JP | 5971175 B2 | 7/2016 |
| JP | 6183607 B2 | 8/2017 |

OTHER PUBLICATIONS

"World's first! Learn about Volvo's pedestrian airbags", Nextage Co., Ltd., May 18, 2023, accessed at https://www.sweden-cars.jp/blog/.

* cited by examiner

*Primary Examiner* — Michael R. Fin
(74) *Attorney, Agent, or Firm* — Holtz, Holtz & Volek PC

(57) ABSTRACT

According to one embodiment, a solar cell system includes a first solar cell, a first electric circuit and controller. The first solar cell is provided on a hood of a vehicle. The first electric circuit is connected to the first solar cell. The controller is configured to electrically connect the first solar cell with the first electric circuit in a case where a traveling speed of the vehicle is less than a first threshold, and electrically disconnect the first solar cell from the first electric circuit in a case where the traveling speed of the vehicle is equal to or greater than the first threshold.

8 Claims, 10 Drawing Sheets

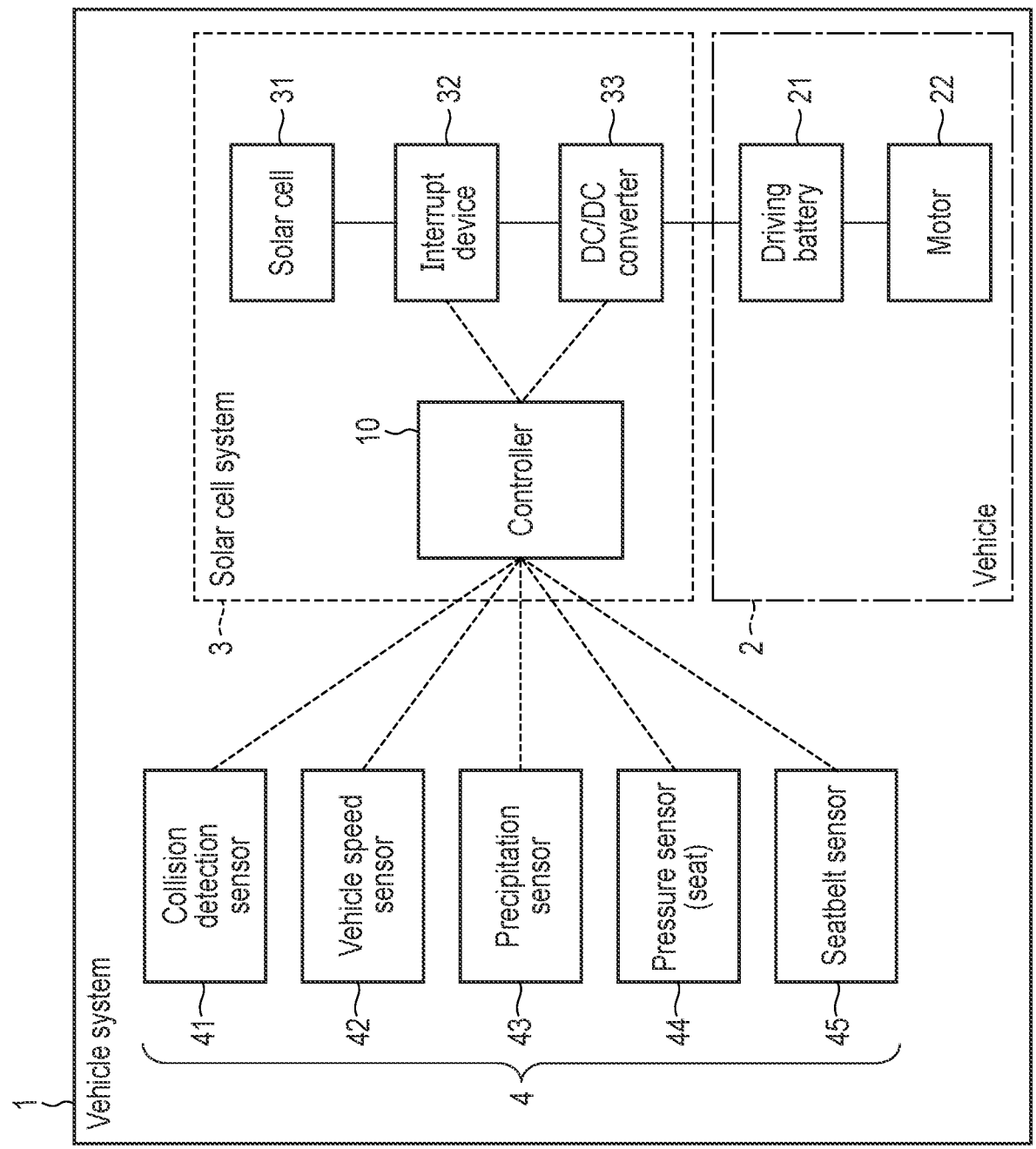
F I G. 1

| Traveling speed of vehicle | Less than first threshold (Less than 20 km/h) | Equal to or greater than first threshold (Equal to or greater than 20 km/h) |
|---|---|---|
| Precipitation sensor | Precipitation is detected | Precipitation is detected |
| Solar cell | Disconnected from electric circuit | Disconnected from electric circuit |

FIG. 4A

| Traveling speed of vehicle | Less than first threshold (Less than 20 km/h) | Equal to or greater than first threshold (Equal to or greater than 20 km/h) |
|---|---|---|
| Precipitation sensor | Precipitation is not detected | Precipitation is not detected |
| Solar cell | Connected to electric circuit | Disconnected from electric circuit |

FIG. 4B

| Mounting place of solar cell | When vehicle is stopped | | When vehicle travels | | | When collision is detected |
| --- | --- | --- | --- | --- | --- | --- |
| | Occupant does not exist | Occupant exists | Less than first threshold (Less than 20 km/h) | Equal to or greater than first threshold and less than second threshold (Equal to or greater than 20 km/h and less than 50 km/h) | Equal to or greater than second threshold (Equal to or greater than 50 km/h) | |
| Hood | Connected to electric circuit | Connected to electric circuit | Connected to electric circuit | Disconnected from electric circuit | Connected to electric circuit | Disconnected from electric circuit |
| Roof and back door | Connected to electric circuit | Connected to electric circuit | Connected to electric circuit | Disconnected from electric circuit | Disconnected from electric circuit | Disconnected from electric circuit |
| Dashboard | Connected to electric circuit | Disconnected from electric circuit | Disconnected from electric circuit | Disconnected from electric circuit | Disconnected from electric circuit | Disconnected from electric circuit |

FIG. 7

| Mounting place of solar cell | Type of solar cell | When vehicle is stopped | | When vehicle travels | | | When collision is detected |
|---|---|---|---|---|---|---|---|
| | | Occupant does not exist | Occupant exists | Less than first threshold (Less than 20 km/h) | Equal to or greater than first threshold and less than second threshold (Equal to or greater than 20 km/h and less than 50 km/h) | Equal to or greater than second threshold (Equal to or greater than 50 km/h) | |
| Hood | Top cell | Connected to electric circuit | Connected to electric circuit | Connected to electric circuit | Disconnected from electric circuit | Connected to electric circuit | Disconnected from electric circuit |
| | Bottom cell | Connected to electric circuit | Connected to electric circuit | Connected to electric circuit | Connected to electric circuit | Connected to electric circuit | Disconnected from electric circuit |
| Roof and back door | Top cell | Connected to electric circuit | Connected to electric circuit | Connected to electric circuit | Connected to electric circuit | Connected to electric circuit | Disconnected from electric circuit |
| | Bottom cell | Connected to electric circuit | Connected to electric circuit | Disconnected from electric circuit | Disconnected from electric circuit | Disconnected from electric circuit | Disconnected from electric circuit |
| Dashboard | Top cell | Connected to electric circuit | Disconnected from electric circuit | Disconnected from electric circuit | Disconnected from electric circuit | Disconnected from electric circuit | Disconnected from electric circuit |
| | Bottom cell | Connected to electric circuit | Disconnected from electric circuit | Disconnected from electric circuit | Disconnected from electric circuit | Disconnected from electric circuit | Disconnected from electric circuit |

F I G. 10

SOLAR CELL SYSTEM AND VEHICLE SYSTEM

CROSS-REFERENCE TO RELATED APPLICATIONS

This application is based upon and claims the benefit of priority from Japanese Patent Application No. 2022-146937, filed Sep. 15, 2022, the entire contents of which are incorporated herein by reference.

FIELD

Embodiments described herein relate generally to a solar cell system and a vehicle system.

BACKGROUND

In recent years, an electric vehicle (EV) and a plug-in hybrid electric vehicle (PHEV) have gradually come into widespread use. In a solar cell system including a solar cell mounted on such a vehicle, control specialized for increasing power generation efficiency is performed, but control for protecting a pedestrian from an electric shock at the time of vehicle collision is not performed.

BRIEF DESCRIPTION OF THE DRAWINGS

FIG. 1 is a block diagram illustrating a schematic configuration example of a vehicle system according to a first embodiment.

FIGS. 4A and 4B are diagrams for explaining control of a solar cell system according to the first embodiment.

FIG. 7 is a diagram for explaining control of a solar cell system according to the first embodiment.

FIG. 10 is a diagram for explaining control of a solar cell system according to the second embodiment.

DETAILED DESCRIPTION

Figures 2, 3:
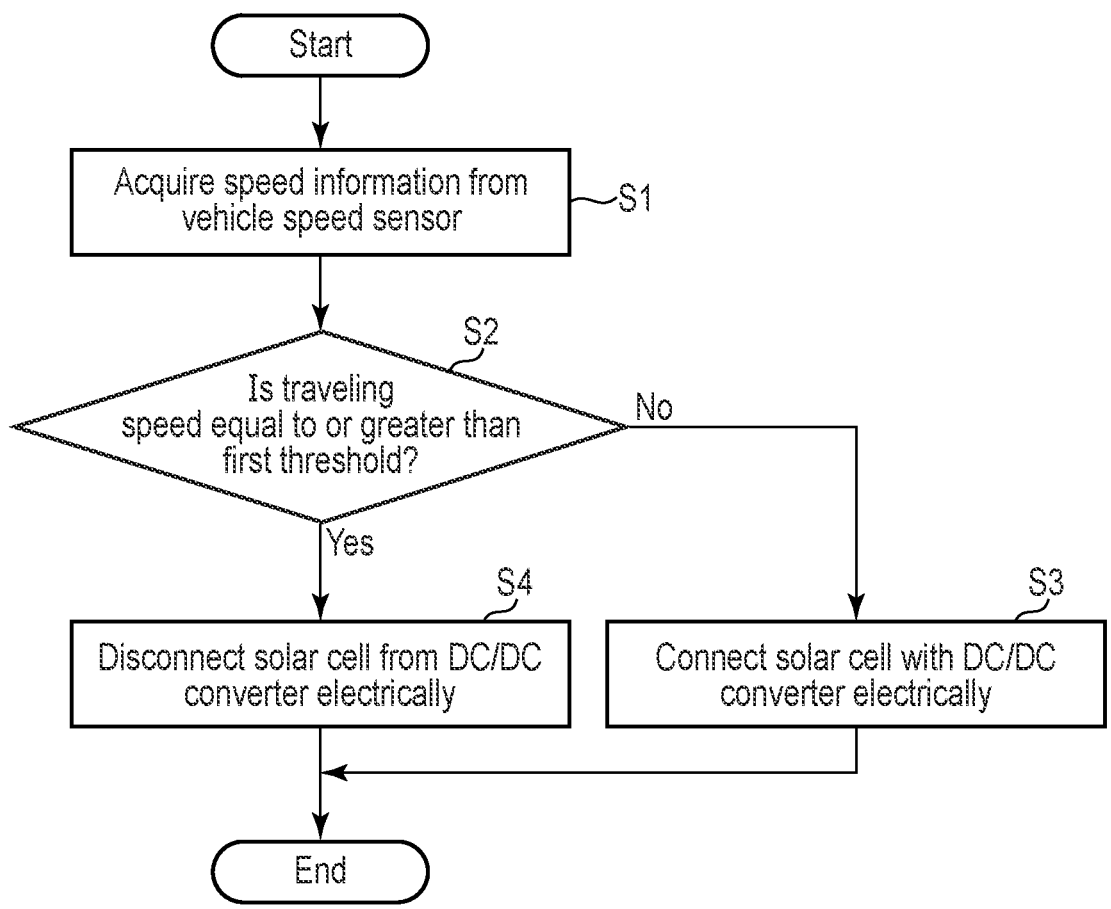
FIG. 2 is a diagram for explaining control of a solar cell system according to the first embodiment.
FIG. 3 is a flowchart illustrating an operation example of a controller that performs control illustrated in FIG. 2.

In general, according to one embodiment, a solar cell system includes a first solar cell, a first electric circuit and controller. The first solar cell is provided on a hood of a vehicle. The first electric circuit is connected to the first solar cell. The controller is configured to electrically connect the first solar cell with the first electric circuit in a case where a traveling speed of the vehicle is less than a first threshold, and electrically disconnect the first solar cell from the first electric circuit in a case where the traveling speed of the vehicle is equal to or greater than the first threshold.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. Further, in the specification and drawings, corresponding elements are denoted by like reference numerals, and a detailed description thereof may be omitted unless otherwise necessary.

First Embodiment

FIG. 1 is a block diagram illustrating a schematic configuration example of a vehicle system 1 according to the first embodiment. As illustrated in FIG. 1, the vehicle system 1 includes a vehicle 2, a solar cell system 3 provided in the vehicle 2, and a sensor group 4 provided in the vehicle 2.

The vehicle 2 includes a driving battery 21 and a motor 22. The driving battery 21 is connected to, for example, the motor 22 and supplies power for driving the motor 22.

The solar cell system 3 includes a controller 10, a solar cell 31, an interrupt device 32, and a DC/DC converter 33 (electric circuit). The controller 10 is a general-purpose microcomputer including a CPU, a memory, and an input/output unit, and may be referred to as an electronic control unit (ECU). The controller 10 controls the operation of the interrupt device 32 and the operation of the DC/DC converter 33.

The solar cell 31 is, for example, a single-layer solar cell that generates power with one cell. The solar cell 31 is configured by stacking a plurality of layers including a wide-gap light absorption layer (photoelectric conversion layer). As the wide-gap light absorption layer, for example, a transparent oxide semiconductor (specifically, cuprous oxide ($Cu_2O$) or the like), a compound semiconductor, a perovskite compound, amorphous silicon, or the like is applied. The solar cell 31 in the present embodiment may have any configuration as long as the solar cell can generate electric power according to incident light. The solar cell 31 is provided, for example, on a hood of the vehicle 2.

The DC/DC converter 33 is connected to the driving battery 21 of the vehicle 2. The DC/DC converter 33 may be connected to the driving battery 21 of the vehicle 2 wirelessly. The DC/DC converter 33 increases or decreases the power generated by the solar cell 31, supplies the increased or decreased power to the driving battery 21, and charges the driving battery 21. The interrupt device 32 is provided between the solar cell 31 and the DC/DC converter 33, and the operation of the interrupt device 32 is controlled by the controller 10 as described above. In accordance with an instruction from the controller 10, the interrupt device 32 switches electrical connection between the solar cell 31 and the DC/DC converter 33 and electrical disconnection between the solar cell 31 and the DC/DC converter.

The sensor group 4 provided in the vehicle 2 includes a collision detection sensor 41, a vehicle speed sensor 42, a precipitation sensor 43, a pressure sensor 44, and a seatbelt sensor 45. The collision detection sensor 41 is, for example, an acceleration sensor that detects acceleration of the vehicle 2 in a longitudinal direction of a vehicle body, and is configured to detect a collision of the vehicle 2. The vehicle speed sensor 42 is a sensor that detects the traveling speed of the vehicle 2. The precipitation sensor 43 is, for example, a water droplet sensing sensor, and is configured to detect the presence or absence of precipitation. The pressure sensor 44 is provided in each seat in the vehicle 2, and is configured to detect a seating state of an occupant in the seat. The seatbelt sensor 45 is configured to detect an attachment/detachment state of a seat belt provided in each seat of the vehicle 2. The controller 10 acquires the detection result of the sensor group 4 and controls the operation of the solar cell system 3 based on the detection result. In the present embodiment, the case where the sensor group 4 provided in the vehicle 2 includes the collision detection sensor 41, the vehicle speed sensor 42, the precipitation sensor 43, the pressure sensor 44, and the seatbelt sensor 45 has been described, but various sensors provided in the vehicle 2 are not limited to this, and other sensors may be further provided in the vehicle 2.

By the way, there is a possibility that the solar cell 31 provided on the hood of the vehicle 2 is damaged when the vehicle 2 collides with a pedestrian. At this time, when the active portion of the solar cell 31 is exposed and the active portion comes into contact with a pedestrian, there is a risk that the pedestrian gets an electric shock. Even when the exposed active portion does not come into direct contact with the pedestrian, the active portion comes into indirect contact with the pedestrian via the vehicle body, and as a result, there is a risk that the pedestrian gets an electric shock.

Therefore, in the solar cell system 3 according to the present embodiment, connection and disconnection states between the solar cell 31 and the DC/DC converter 33 are switched according to the traveling speed of the vehicle 2, and the electric shock to the above-described pedestrian is prevented. Specifically, as illustrated in FIG. 2, in a case where the traveling speed of the vehicle 2 is less than a preset first threshold, there is a low possibility that the solar cell 31 is damaged even when the vehicle 2 comes into contact with a pedestrian. Therefore, in the solar cell system 3, the solar cell 31 is electrically connected to the DC/DC converter 33, and the driving battery 21 provided in the vehicle 2 is charged. On the other hand, in a case where the traveling speed of the vehicle 2 is equal to or greater than the preset first threshold, there is a high possibility that the solar cell 31 is damaged when the vehicle 2 comes into contact with the pedestrian, and there is a high possibility that the active portion of the solar cell 31 is exposed and comes into contact with the pedestrian or the vehicle body. Therefore, in the solar cell system 3, the solar cell 31 is electrically disconnected from the DC/DC converter 33, and the above-described pedestrian is prevented from getting an electric shock. In the present embodiment, it is assumed that the first threshold described above is set to 20 km/h, but the first threshold is not limited to this value.

FIG. 3 is a flowchart illustrating an operation example of the controller 10 that performs control illustrated in FIG. 2. As illustrated in FIG. 3, when acquiring speed information from the vehicle speed sensor 42 provided in the vehicle 2 (Step S1), the controller 10 determines whether or not the traveling speed of the vehicle 2 indicated by the acquired speed information is equal to or greater than the first threshold (Step S2).

As a result of the processing in Step S2, in a case where it is determined that the traveling speed of the vehicle 2 is less than the first threshold (No in Step S2), the controller 10 controls the operation of the interrupt device 32 such that the solar cell 31 is electrically connected to the DC/DC converter 33 (Step S3). That is, the power generated by the solar cell 31 is increased or decreased by the DC/DC converter 33 and supplied to the driving battery 21. Therefore, the driving battery 21 can be charged.

On the other hand, as a result of the processing in Step S2, in a case where it is determined that the traveling speed of the vehicle 2 is equal to or greater than the first threshold (Yes in Step S2), the controller 10 controls the operation of the interrupt device 32 such that the solar cell 31 is electrically disconnected from the DC/DC converter 33 (Step S4). Therefore, since no voltage/current is generated between the solar cell 31 and the DC/DC converter 33, even when the vehicle 2 collides with a pedestrian, the active portion of the solar cell 31 is exposed, and the active portion comes into contact with the pedestrian or the vehicle body, the electric shock to the above-described pedestrian can be prevented.

In the present embodiment described above, the case where the controller 10 switches the connection and disconnection states between the solar cell 31 and the DC/DC converter 33 according to the traveling speed of the vehicle 2 has been described. However, the controller 10 may switch the connection and disconnection states between the solar cell 31 and the DC/DC converter 33 in consideration of not only the traveling speed of the vehicle 2 but also the presence or absence of precipitation.

FIGS. 4A and 4B are diagrams for explaining control of the solar cell system 3 based on the traveling speed of the vehicle 2 and the presence or absence of precipitation. In a case where there is precipitation, there is a high possibility that a pedestrian gets an electric shock when the vehicle 2 collides with the pedestrian, and the power generation efficiency of the solar cell 31 also decreases due to the influence of rain clouds. Therefore, as illustrated in FIG. 4A, in the solar cell system 3, the solar cell 31 is electrically disconnected from the DC/DC converter 33 regardless of the traveling speed of the vehicle 2, and the electric shock to the above-described pedestrian is prevented. On the other hand, as illustrated in FIG. 4B, in a case where there is no precipitation, the solar cell system 3 performs control according to the traveling speed of the vehicle 2. Specifically, similarly to the control illustrated in FIG. 2, in a case where the traveling speed of the vehicle 2 is less than the first threshold, the solar cell 31 is electrically connected to the DC/DC converter 33, and in a case where the traveling speed of the vehicle 2 is equal to or greater than the first threshold, the solar cell 31 is electrically disconnected from the DC/DC converter 33.

Figure 5:
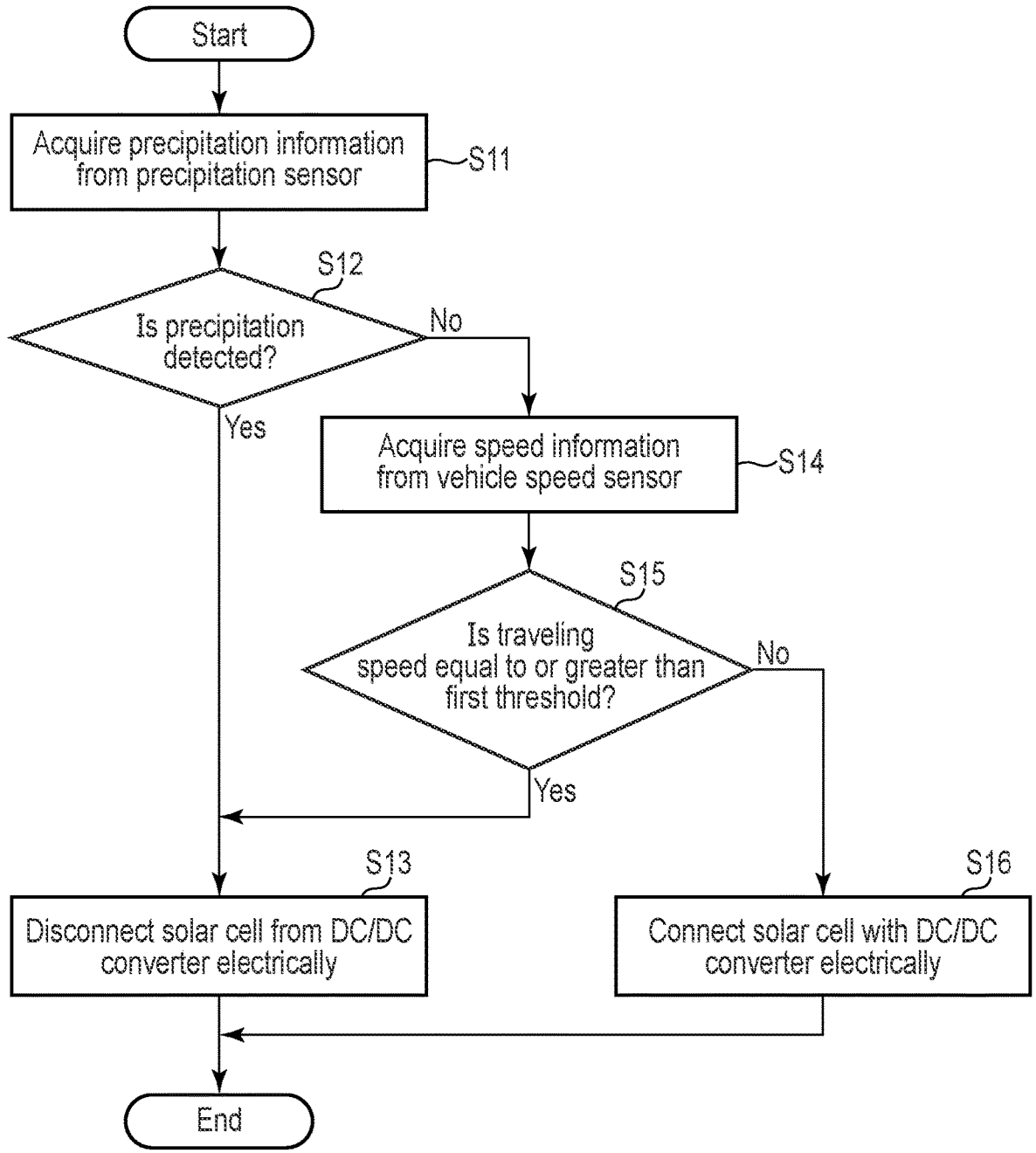
FIG. 5 is a flowchart illustrating an operation example of a controller that performs the control illustrated in FIGS. 4A and 4B.

FIG. 5 is a flowchart illustrating an operation example of the controller 10 that performs the control illustrated in FIGS. 4A and 4B. As illustrated in FIG. 5, when acquiring precipitation information from the precipitation sensor 43 provided in the vehicle 2 (Step S11), the controller 10 determines whether or not there is precipitation based on the acquired precipitation information (Step S12).

As a result of the processing in Step S12, in a case where it is determined that there is precipitation (Yes in Step S12), the controller 10 controls the operation of the interrupt device 32 such that the solar cell 31 is electrically disconnected from the DC/DC converter 33 (Step S13). Therefore, since no voltage/current is generated between the solar cell 31 and the DC/DC converter 33, the electric shock to the above-described pedestrian can be prevented.

On the other hand, as a result of the processing of Step S12, in a case where it is determined that there is no precipitation (No in Step S12), when acquiring speed information from the vehicle speed sensor 42 provided in the vehicle 2 (Step S14), the controller 10 determines whether or not the traveling speed of the vehicle 2 indicated by the acquired speed information is equal to or greater than the first threshold (Step S15).

As a result of the processing in Step S15, in a case where it is determined that the traveling speed of the vehicle 2 is equal to or greater than the first threshold (Yes in Step S15), the controller 10 executes the processing in Step S13 described above. That is, the controller 10 controls the operation of the interrupt device 32 such that the solar cell 31 is electrically disconnected from the DC/DC converter 33.

On the other hand, as a result of the processing in Step S15, in a case where it is determined that the traveling speed of the vehicle 2 is less than the first threshold (No in Step S15), the controller 10 controls the operation of the interrupt device 32 such that the solar cell 31 is electrically connected to the DC/DC converter 33 (Step S16), and then a series of the processing is ended.

Figure 6B:
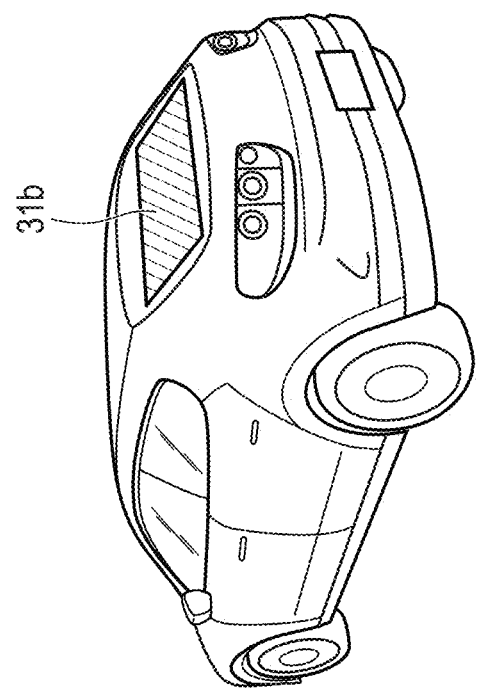
FIGS. 6A and 6B are diagrams for explaining a mounting place of a solar cell according to the first embodiment.
Figure 6A:
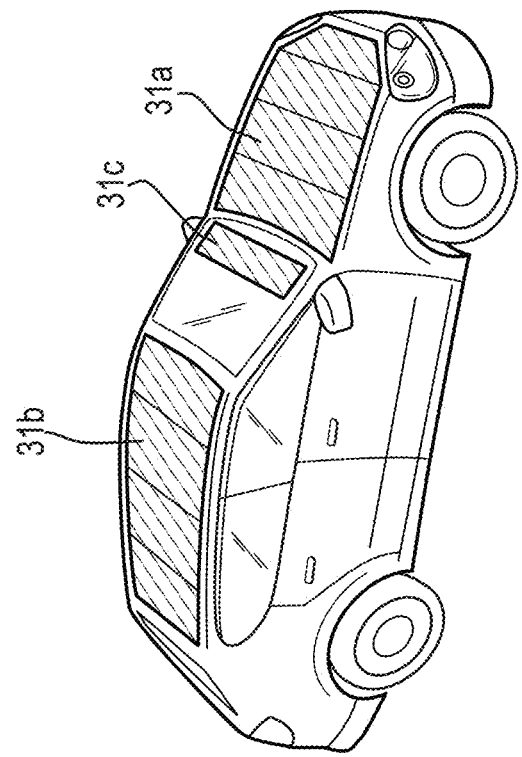

In the present embodiment described above, the case where the control of the solar cell system 3 including the solar cell 31 provided on the hood of the vehicle 2 when it is assumed that the solar cell 31 is provided on the hood of the vehicle 2 has been described. However, as illustrated in FIGS. 6A and 6B, the solar cell 31 may be further provided on a roof, a back door, a vehicle interior dashboard, or the like of the vehicle 2. In the following description, for the sake of convenience, "a" is added to the end of elements included in the solar cell system 3 including the solar cell 31 provided on the hood of the vehicle 2, "b" is added to the end of elements included in the solar cell system 3 including the solar cell 31 provided on the roof or back door of the vehicle 2, and "c" is added to the end of elements included in the solar cell system 3 including the solar cell 31 provided on the dashboard of the vehicle 2.

FIG. 7 is a diagram for explaining control of a solar cell system 3a including a solar cell 31a provided on the hood of the vehicle 2, control of a solar cell system 3b including a solar cell 31b provided on the roof or back door of the vehicle 2, and control of a solar cell system 3c including a solar cell 31c provided on the dashboard of the vehicle 2. In FIG. 7, it is assumed that a second threshold greater than the first threshold is further set in addition to the first threshold described above as a threshold related to the traveling speed of the vehicle 2. The second threshold is set to, for example, 50 km/h. As described above, by setting a plurality of the thresholds, the switching of the connection and disconnection states between the solar cell 31 and the DC/DC converter 33 can be more finely controlled, and thus efficient power generation can be realized as compared with a case where one threshold is set.

First, the control of the solar cell system 3a including the solar cell 31a provided on the hood of the vehicle 2 will be described.

As described above, in a case where the traveling speed of the vehicle 2 is less than the first threshold (and in a case where the vehicle 2 is stopped), even when the vehicle 2 collides with a pedestrian, there is a low possibility that the solar cell 31a is damaged. Therefore, in the solar cell system 3a, the solar cell 31a is electrically connected to the DC/DC converter 33a, and the driving battery 21 provided in the vehicle 2 is charged.

In a case where the traveling speed of the vehicle 2 is equal to or greater than the first threshold and less than the second threshold, there is a high possibility that the solar cell 31a is damaged when the vehicle 2 comes into contact with a pedestrian, and there is a high possibility that the active portion of the solar cell 31a is exposed and comes into contact with the pedestrian or the vehicle body. Therefore, in the solar cell system 3a, the solar cell 31a is electrically disconnected from the DC/DC converter 33a, and the electric shock to the above-described pedestrian is prevented.

In a case where the traveling speed of the vehicle 2 is equal to or greater than the second threshold, there is a high possibility that the vehicle 2 is not on a road on which pedestrians can come and go but on an automobile exclusive road or an expressway on which pedestrians do not come and go. That is, in a case where the traveling speed of the vehicle 2 is equal to or greater than the second threshold, there is a low possibility that the vehicle 2 collides with a pedestrian. Therefore, in the solar cell system 3a, the solar cell 31a is electrically connected to the DC/DC converter 33a, and the driving battery 21 provided in the vehicle 2 is charged.

Next, the control of the solar cell system 3b including the solar cell 31b provided on the roof or back door of the vehicle 2 will be described.

The solar cell 31b provided on the roof or back door of the vehicle 2 is different from the solar cell 31a provided on the hood, and even when the vehicle 2 collides with a pedestrian and the active portion of the solar cell 31b is exposed, there is a low possibility that the exposed active portion comes into contact with the pedestrian. However, there is a possibility that the exposed active portion comes into contact with the vehicle body and the active portion comes into indirect contact with an occupant in the vehicle via the vehicle body. Thus, there is a risk that the occupant in the vehicle gets an electric shock. Therefore, the solar cell system 3b including the solar cell 31b provided on the roof or back door of the vehicle 2 performs control for preventing the electric shock to the occupant in the vehicle.

Specifically, in a case where the traveling speed of the vehicle 2 is less than the first threshold (and in a case where the vehicle 2 is stopped), even when the vehicle 2 collides with a pedestrian, there is a low possibility that the solar cell 31b is damaged. Therefore, in the solar cell system 3b, the solar cell 31b is electrically connected to the DC/DC converter 33b, and the driving battery 21 provided in the vehicle 2 is charged.

In a case where the traveling speed of the vehicle 2 is equal to or greater than the first threshold and less than the second threshold, there is a high possibility that the solar cell 31b is damaged when the vehicle 2 comes into contact with a pedestrian, and there is a high possibility that the active portion of the solar cell 31b is exposed and comes into indirect contact with an occupant in the vehicle. Therefore, in the solar cell system 3b, the solar cell 31b is electrically disconnected from the DC/DC converter 33b, and the electric shock to the above-described occupant is prevented.

In a case where the traveling speed of the vehicle 2 is equal to or greater than the second threshold, there is a high possibility that the vehicle 2 is on the automobile exclusive road or the expressway on which pedestrians do not come and go, and there is a low possibility that the vehicle 2 collides with the pedestrians. However, there is a possibility that the vehicle 2 collides with a predetermined object other than the pedestrian (for example, another vehicle traveling in front of the vehicle 2, an obstacle placed on a road, or the like). In a case where the vehicle 2 collides with a predetermined object when the traveling speed is equal to or greater than the second threshold, there is a high possibility that the solar cell 31b is damaged, and there is a high possibility that the active portion of the solar cell 31b is exposed and comes into indirect contact with an occupant in the vehicle. Therefore, in the solar cell system 3b, the solar cell 31b is electrically disconnected from the DC/DC converter 33b, and the electric shock to the above-described occupant is prevented.

In a case where the vehicle 2 collides with a predetermined object when the traveling speed is equal to or greater than the second threshold, there is a high possibility that the solar cell 31a provided on the hood of the vehicle 2 is also damaged similarly to the solar cell 31b provided on the roof or the back door, and there is a possibility that the active portion of the solar cell 31a is exposed and comes into contact with the vehicle body. However, since the solar cell 31a provided on the hood is located to be separated from the occupant in the vehicle as compared with the solar cell 31b provided on the roof or the back door, even when the active portion of the solar cell 31a is exposed and comes into contact with the vehicle body, there is a low possibility that the electric shock to the above-described occupant occurs. Therefore, as described above, in the solar cell system 3a including the solar cell 31a provided on the hood, the solar cell 31a and the DC/DC converter 33a are electrically connected to each other to charge the driving battery 21 even when the traveling speed of the vehicle 2 is equal to or greater than the second threshold.

The control of the solar cell system 3c including the solar cell 31c provided on the dashboard of the vehicle 2 will be described.

When the solar cell 31c provided on the dashboard of the vehicle 2 generates electric power in a state in which an occupant exists in the vehicle regardless of whether or not the vehicle 2 collides with a pedestrian, there is a risk that the occupant in the vehicle get an electric shock. Therefore, the solar cell system 3c including the solar cell 31c performs control based on the presence or absence of the occupant regardless of the traveling speed of the vehicle 2.

Specifically, in a case where the occupant exists in the interior of the vehicle 2, in the solar cell system 3c, the solar cell 31c is electrically disconnected from the DC/DC converter 33c, and the electric shock to the above-described occupant is prevented. On the other hand, in a case where the occupant does not exist in the interior of the vehicle 2, in the solar cell system 3c, the solar cell 31c is electrically connected to the DC/DC converter 33c, and the driving battery 21 is charged. The presence or absence of occupant is determined based on, for example, pressure information acquired from the pressure sensor 44 provided in each seat in the vehicle.

As illustrated in FIG. 7, in a case where it is detected that the vehicle 2 collides with a pedestrian or a predetermined object, in the entire solar cell system 3, the solar cell 31 is electrically disconnected from the DC/DC converter 33 to prevent the electric shock to the above-described pedestrian and the electric shock to the above-described occupant. The collision of the vehicle 2 is detected based on, for example, collision information acquired from the collision detection sensor 41.

According to the first embodiment described above, the solar cell system 3 includes the controller 10 that controls the operation of the interrupt device 32 so as to electrically disconnect the solar cell 31 from the DC/DC converter 33 in a case where there is a risk that a pedestrian or an occupant gets an electric shock, and thus, it is possible to protect the pedestrian or the occupant from the electric shock (ensure safety of the pedestrian or the occupant).

Second Embodiment

Next, a second embodiment will be described. A vehicle system 1 according to a second embodiment is different from that of the first embodiment described above in that the solar cell 31 provided in the vehicle 2 is a tandem solar cell including a top cell and a bottom cell. Hereinafter, portions different from those of the first embodiment will be mainly described, and description of portions similar to those of the first embodiment will be omitted.

Figure 8:
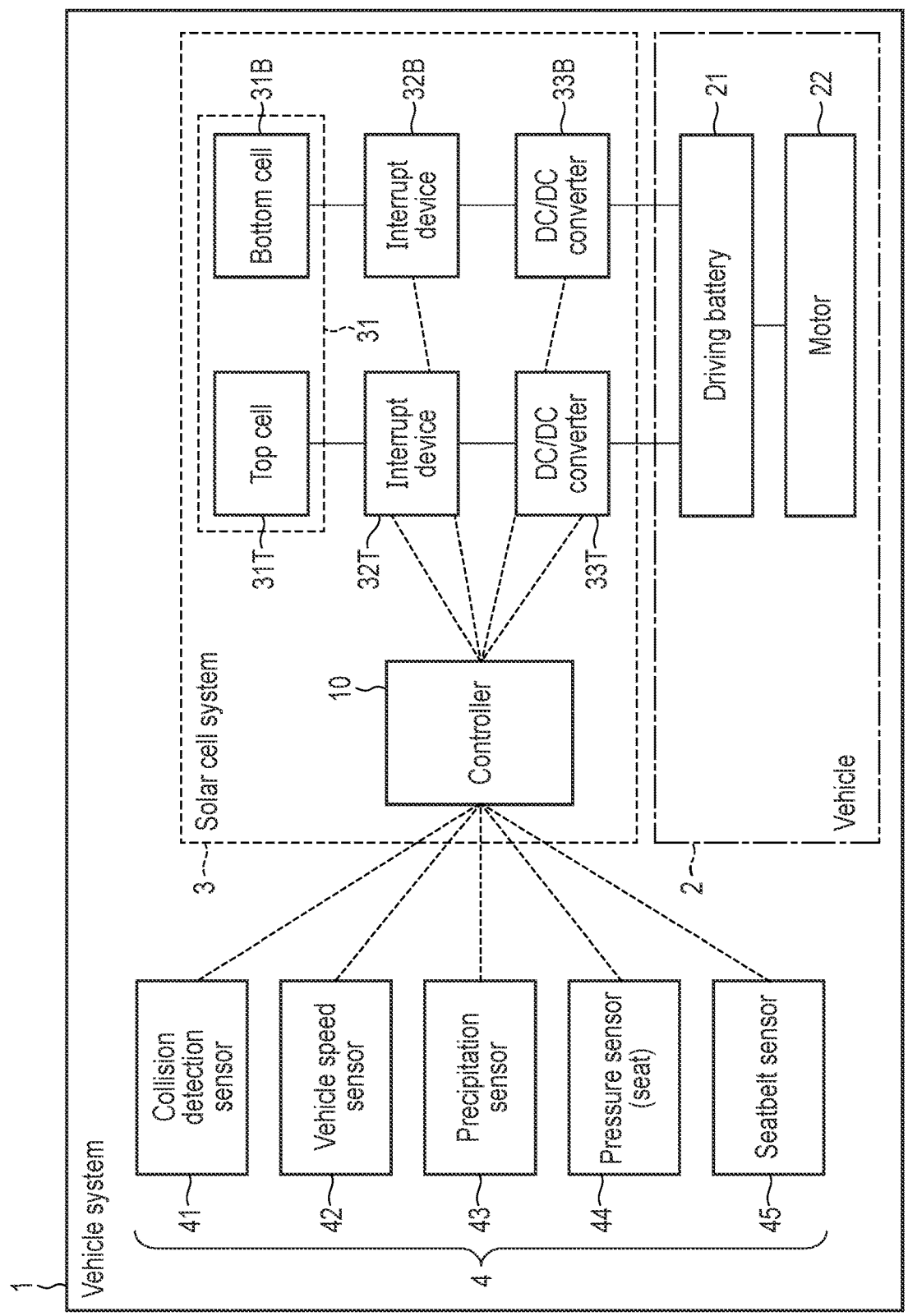
FIG. 8 is a block diagram illustrating a schematic configuration example of a vehicle system according to a second embodiment.

As illustrated in FIG. 8, the solar cell system 3 according to the present embodiment includes a controller 10, a top cell 31T constituting the solar cell 31, an interrupt device 32T connected to the top cell 31T, a DC/DC converter 33T connected to the interrupt device 32T, a bottom cell 31B constituting the solar cell 31, an interrupt device 32B connected to the bottom cell 31B, and a DC/DC converter 33B connected to the interrupt device 32B.

The DC/DC converters 33T and 33B are connected to the driving battery 21 of the vehicle 2. The DC/DC converter 33T corresponding to the top cell 31T and the DC/DC converter 33B corresponding to the bottom cell 31B may be connected to a plurality of batteries which have different voltages and are provided in the vehicle 2. For example, the DC/DC converter 33B corresponding to the bottom cell 31B may be connected to the driving battery, and the DC/DC converter 33T corresponding to the top cell 31T may be connected to a battery having a voltage lower than that of the driving battery. The DC/DC converter 33T corresponding to the top cell 31T may be connected to the driving battery, and the DC/DC converter 33B corresponding to the bottom cell 31B may be connected to the battery having a voltage lower than that of the driving battery.

The tandem solar cell 31 includes the top cell 31T and the bottom cell 31B, and generates power in each of these two cells. For example, cuprous oxide (Cu2O) is applied to the light absorption layer of the top cell 31T. For example, crystalline silicon is applied to the light absorption layer of the bottom cell 31B.

Figure 9:
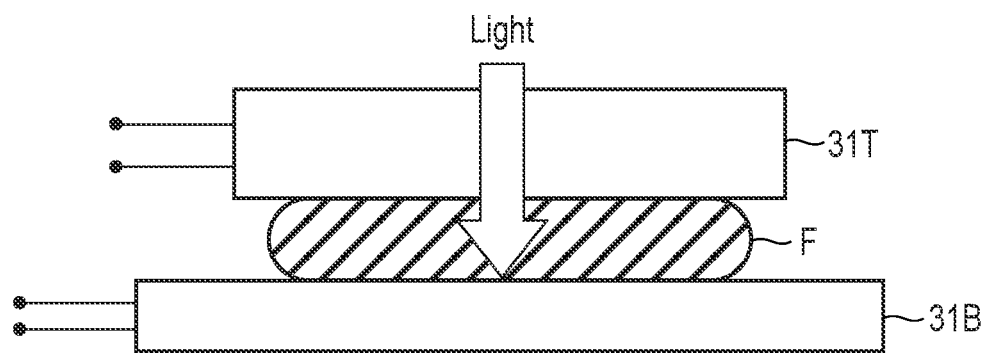
FIG. 9 is a cross-sectional view illustrating a schematic configuration example of a tandem solar cell according to the second embodiment.

FIG. 9 is a cross-sectional view illustrating a schematic configuration example of the tandem solar cell 31. As illustrated in FIG. 9, the tandem solar cell 31 includes the top cell 31T and the bottom cell 31B, and the top cell 31T and the bottom cell 31B are bonded to each other by an insulating adhesive film F. According to the insulating adhesive film F, in a case where the top cell 31T is damaged and the active portion of the top cell 31T is exposed, it is possible to prevent the active portion from coming into contact with the bottom cell 31B or the vehicle body. Similarly, according to the insulating adhesive film F, in a case where the bottom cell 31B is damaged and the active portion of the bottom cell 31B is exposed, it is possible to prevent the active portion from coming into contact with the top cell 31T or the pedestrian.

The top cell 31T and the adhesive film F are formed of a transparent material for allowing light to enter the bottom cell 31B. Power generated by each of the top cell 31T and the bottom cell 31B is supplied to the driving battery 21, and the driving battery 21 is charged. As described above, the top cell 31T and the bottom cell 31B may supply power to a plurality of batteries which have different voltages and are provided in the vehicle 2.

As described in the first embodiment, in a case where the vehicle 2 collides with a pedestrian and the solar cell 31 is damaged, there is a risk that the solar cell 31 provided on the hood of the vehicle 2 causes the pedestrian to get an electric shock. In a case where the vehicle 2 collides with a pedestrian and the solar cell 31 is damaged, there is a risk that the solar cell 31 provided on the roof or back door of the vehicle 2 causes the occupant in the vehicle to get an electric shock.

In a case where the solar cell 31 provided in the vehicle 2 is of the tandem type, the top cell 31T out of two cells constituting the solar cell 31 provided on the hood easily comes into contact with the pedestrian and is highly likely to cause an electric shock to the pedestrian. In a case where the solar cell 31 provided in the vehicle 2 is of the tandem type, the bottom cell 31B out of two cells constituting the solar cell 31 provided on the roof or the back door easily comes into contact with the vehicle body and is highly likely to cause an electric shock to the occupant in the vehicle. Thus, the solar cell system 3 according to the present embodiment performs different control for the top cell 31T and the bottom cell 31B depending on the mounting place of the tandem solar cell 31. Therefore, efficient power generation can be performed while preventing the electric shock to the above-described pedestrian and the electric shock to the above-described occupant.

FIG. 10 is a diagram for explaining the control of the solar cell system 3 including the tandem solar cell 31. In the following description, for the sake of convenience, "a" is added to the end of elements included in the solar cell system 3 including the solar cell 31 provided on the hood of the vehicle 2, "b" is added to the end of elements included in the solar cell system 3 including the solar cell 31 provided on the roof or back door of the vehicle 2, and "c" is added to the end of elements included in the solar cell system 3 including the solar cell 31 provided on the dashboard of the vehicle 2.

First, the control of the solar cell system 3a including the solar cell 31a provided on the hood of the vehicle 2 will be described.

In a case where the traveling speed of the vehicle 2 is less than the first threshold (and in a case where the vehicle 2 is stopped), even when the vehicle 2 collides with a pedestrian, there is a low possibility that the solar cell 31a is damaged. Therefore, in the solar cell system 3a including the solar cell 31a, a top cell 31Ta constituting the solar cell 31a is electrically connected to a DC/DC converter 33Ta, a bottom cell 31Ba constituting the solar cell 31a is electrically connected to a DC/DC converter 33Ba (that is, electrically connected to the DC/DC converter corresponding to both the top cell and the bottom cell), and the driving battery 21 provided in the vehicle 2 is charged.

In a case where the traveling speed of the vehicle 2 is equal to or greater than the first threshold and less than the second threshold, there is a high possibility that the solar cell 31a is damaged when the vehicle 2 comes into contact with a pedestrian, and there is a high possibility that the active portion of the top cell 31Ta constituting the solar cell 31a is exposed and comes into contact with the pedestrian. Therefore, in the solar cell system 3a, the top cell 31Ta constituting the solar cell 31a is electrically disconnected from the DC/DC converter 33Ta, and the electric shock to the above-described pedestrian is prevented. On the other hand, since there is a low possibility that the bottom cell 31Ba constituting the solar cell 31a comes into contact with a pedestrian, in the solar cell system 3a, the bottom cell 31Ba is electrically connected to the DC/DC converter 33Ba, and the driving battery 21 provided in the vehicle 2 is charged.

In a case where the traveling speed of the vehicle 2 is equal to or greater than the second threshold, there is a high possibility that the vehicle 2 is on an automobile exclusive road or an expressway on which pedestrians do not come and go as described in the first embodiment. That is, in a case where the traveling speed of the vehicle 2 is equal to or greater than the second threshold, there is a low possibility that the vehicle 2 collides with a pedestrian. Therefore, in the solar cell system 3a including the solar cell 31a, the top cell 31Ta constituting the solar cell 31a is electrically connected to the DC/DC converter 33Ta, the bottom cell 31Ba constituting the solar cell 31a is electrically connected to the DC/DC converter 33Ba, and the driving battery 21 provided in the vehicle 2 is charged.

Next, the control of the solar cell system 3b including the solar cell 31b provided on the roof or back door of the vehicle 2 will be described.

In a case where the traveling speed of the vehicle 2 is less than the first threshold (and in a case where the vehicle 2 is stopped), even when the vehicle 2 collides with a pedestrian, there is a low possibility that the solar cell 31b is damaged. Therefore, in the solar cell system 3b, a top cell 31Tb constituting the solar cell 31b is electrically connected to a DC/DC converter 33Tb, a bottom cell 31Bb constituting the solar cell 31b is electrically connected to a DC/DC converter 33Bb (that is, electrically connected to the DC/DC converter corresponding to both the top cell and the bottom cell), and the driving battery 21 provided in the vehicle 2 is charged.

In a case where the traveling speed of the vehicle 2 is equal to or greater than the first threshold and less than the second threshold, there is a high possibility that the solar cell 31b is damaged when the vehicle 2 comes into contact with a pedestrian, and there is a high possibility that the active portion of the bottom cell 31Bb constituting the solar cell 31b is exposed and comes into indirect contact with an occupant in the vehicle. Therefore, in the solar cell system 3b, the bottom cell 31Bb constituting the solar cell 31b is electrically disconnected from the DC/DC converter 33Bb, and the electric shock to the above-described occupant is prevented. On the other hand, since there is a low possibility that the top cell 31Tb constituting the solar cell 31b comes into contact with the vehicle body, in the solar cell system 3b, the top cell 31Tb is electrically connected to the DC/DC converter 33Tb, and the driving battery 21 provided in the vehicle 2 is charged.

In a case where the traveling speed of the vehicle 2 is equal to or greater than the second threshold, there is a high possibility that the vehicle 2 is on the automobile exclusive road or the expressway on which pedestrians do not come and go, and there is a low possibility that the vehicle 2 collides with the pedestrians. However, there is a possibility that the vehicle 2 collides with a predetermined object other than the pedestrian (for example, another vehicle traveling in front of the vehicle 2, an obstacle placed on a road, or the like). In a case where the vehicle 2 collides with a predetermined object when the traveling speed is equal to or greater than the second threshold, there is a high possibility that the solar cell 31b is damaged, and there is a high possibility that the active portion of the bottom cell 31Bb constituting the solar cell 31b is exposed and comes into indirect contact with an occupant in the vehicle. Therefore, in the solar cell system 3b, the bottom cell 31Bb constituting the solar cell 31b is electrically disconnected from the DC/DC converter 33Bb, and the electric shock to the above-described occupant is prevented. On the other hand, since there is a low possibility that the top cell 31Tb constituting the solar cell 31b comes into contact with the vehicle body, in the solar cell system 3b, the top cell 31Tb is electrically connected to the DC/DC converter 33Tb, and the driving battery 21 provided in the vehicle 2 is charged.

In a case where the vehicle 2 collides with a predetermined object when the traveling speed is equal to or greater than the second threshold, there is a high possibility that the solar cell 31a provided on the hood of the vehicle 2 is also damaged similarly to the solar cell 31b provided on the roof or the back door, and there is a possibility that the active portions of the top cell 31Ta and bottom cell 31Ba constituting the solar cell 31a are exposed and come into contact with the vehicle body. However, since the solar cell 31a provided on the hood is located to be separated from the occupant in the vehicle as compared with the solar cell 31b provided on the roof or the back door, even when the active portions of the top cell 31Ta and bottom cell 31Ba constituting the solar cell 31a are exposed and come into contact with the vehicle body, there is a low possibility that the electric shock to the above-described occupant occurs. Therefore, as described above, in the solar cell system 3a including the solar cell 31a provided on the hood, even when the traveling speed of the vehicle 2 is equal to or greater than the second threshold, the top cell 31Ta constituting the solar cell 31a is electrically connected to the DC/DC converter 33Ta, the bottom cell 31Ba constituting the solar cell 31a is electrically connected to the DC/DC converter 33Ba, and the driving battery 21 is charged.

The control of the solar cell system 3c including the solar cell 31c provided on the dashboard of the vehicle 2 will be described.

When the solar cell 31c provided on the dashboard of the vehicle 2 generates electric power in a state in which an occupant exists in the vehicle regardless of whether or not the vehicle 2 collides with a pedestrian, there is a risk that the occupant in the vehicle get an electric shock. Therefore, the solar cell system 3c including the solar cell 31c performs control based on the presence or absence of the occupant regardless of the traveling speed of the vehicle 2.

Specifically, in a case where an occupant exists in the interior of the vehicle 2, in the solar cell system 3c, a top cell 31Tc constituting the solar cell 31c is electrically disconnected from a DC/DC converter 33Tc, a bottom cell 31Bc constituting the solar cell 31c is electrically disconnected form a DC/DC converter 33Bc, and thus the electric shock to the above-described occupant is prevented. On the other hand, in a case where the occupant does not exist in the interior of the vehicle 2, in the solar cell system 3c, the top cell 31Tc constituting the solar cell 31c is electrically connected to the DC/DC converter 33Tc, the bottom cell 31Bc constituting the solar cell 31c is electrically connected to the DC/DC converter 33Bc, and thus the driving battery 21 is charged. The presence or absence of occupant is determined based on, for example, pressure information acquired from the pressure sensor 44 provided in each seat in the vehicle.

As illustrated in FIG. 10, in a case where it is detected that the vehicle 2 collides with a pedestrian or a predetermined object, the top cell 31T and bottom cell 31B constituting the solar cell 31 included in the entire solar cell system 3 are electrically disconnected from the corresponding DC/DC converters 33 to prevent the electric shock to the above-described pedestrian and the electric shock to the above-described occupant. The collision of the vehicle 2 is detected based on, for example, collision information acquired from the collision detection sensor 41.

According to the second embodiment described above, the solar cell system 3 includes the tandem solar cell 31, and includes the controller 10 that controls the operation of the interrupt device 32 such that a cell, which is likely to cause an electric shock to a pedestrian or an occupant, of the top cell 31T and bottom cell 31B constituting the solar cell 31 is electrically disconnected from the DC/DC converter 33, and a cell, which is less likely to cause an electric shock to the pedestrian or the passenger, is electrically connected to the DC/DC converter 33. Therefore, it is possible to realize efficient power generation while protecting the pedestrian and the occupant from the electric shock.

Hereinafter, a modification example will be described.

MODIFICATION EXAMPLE

Figure 11A:
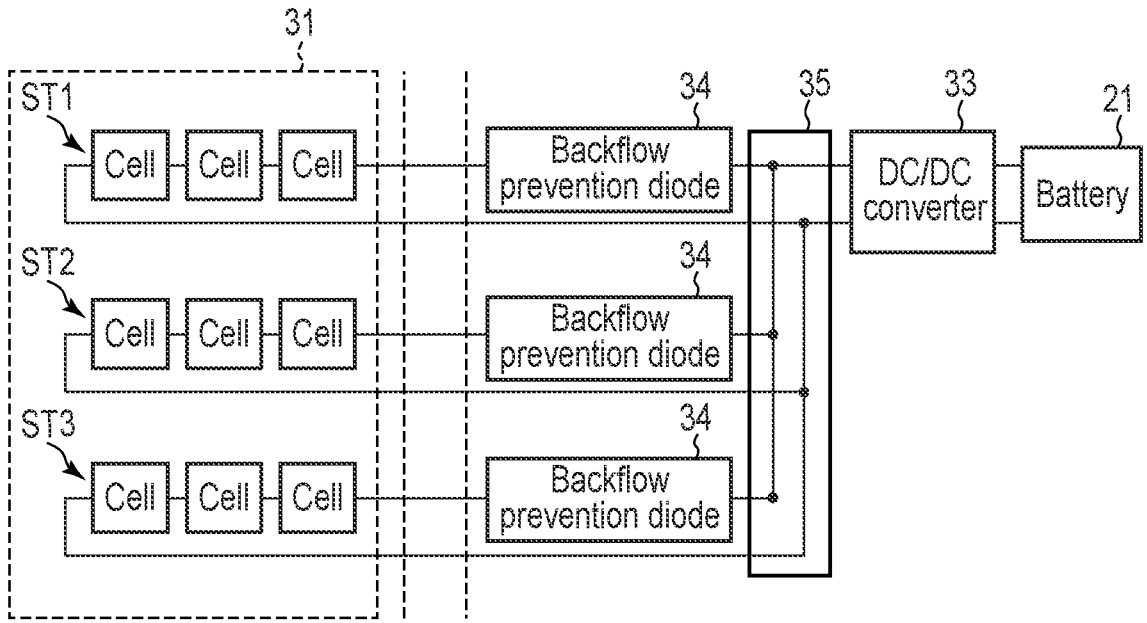
FIGS. 11A and 11B are diagrams for explaining a solar cell system according to a modification example.
Figure 11B:
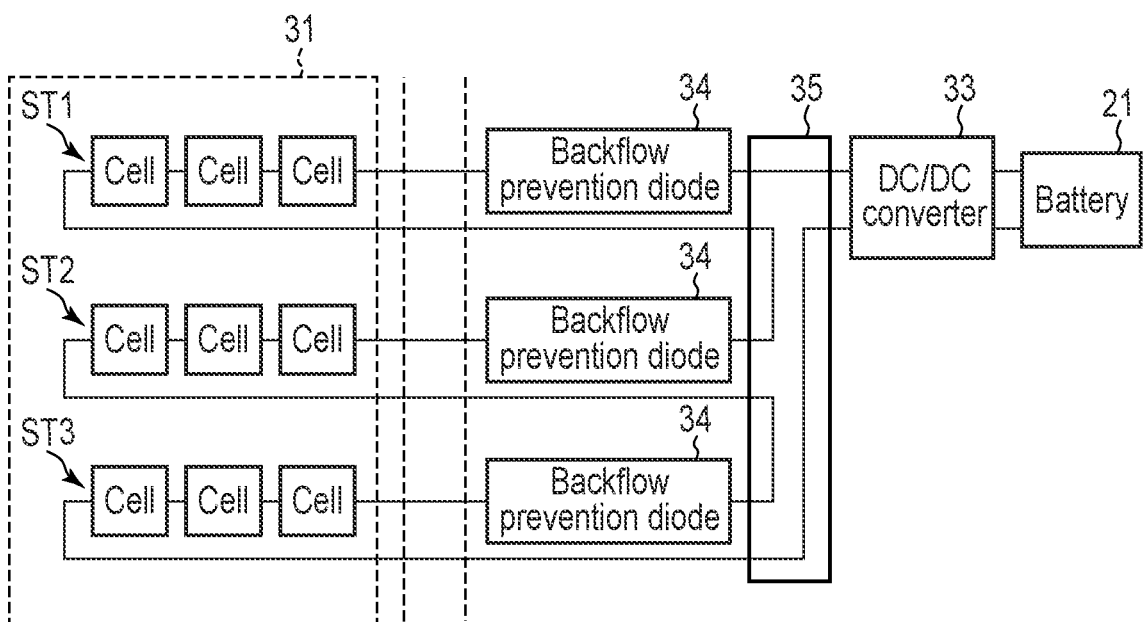

FIGS. 11A and 11B are diagrams for explaining the solar cell system 3 according to the modification example. As illustrated in FIGS. 11A and 11B, the solar cell system 3 according to the modification example includes a solar cell 31 including a plurality of strings ST1 to ST3 in which a plurality of solar cells are connected in series, a plurality of backflow prevention diodes 34 respectively connected to the strings ST1 to ST3, a switch circuit 35, and a DC/DC converter 33. The switch circuit 35 is installed between a plurality of the backflow prevention diodes 34 and the DC/DC converter 33, and switches parallel-connection of a plurality of the strings ST1 to ST3 as illustrated in FIG. 11A and series-connection of a plurality of the strings ST1 to ST3 as illustrated in FIG. 11B. The switch circuit 35 performs the switching operation described above in accordance with an instruction from the controller 10. An interrupt device 32 may be further provided between the switch circuit 35 and the DC/DC converter 33.

In a case where a plurality of the strings ST1 to ST3 are connected in parallel, the output voltage of the solar cell 31 can be decreased as compared with the case where a plurality of the strings ST1 to ST3 are connected in series. Therefore, for example, by performing "switching of a plurality of the strings ST1 to ST3 into parallel connection" instead of "electrically disconnecting the solar cell 31 from the DC/DC converter 33" in the first embodiment and the second embodiment, the output voltage of the solar cell 31 can be decreased to protect a pedestrian and an occupant from an electric shock. In a case where an occupant exists in the interior of the vehicle 2, a plurality of the strings ST1 to ST3 may be connected in parallel, and in a case where the occupant does not exist in the interior of the vehicle 2, a plurality of the strings ST1 to ST3 may be connected in series to protect the pedestrian and the occupant from the electric shock.

In the present specification, it is assumed that the vehicle 2 is an EV or a PHEV, but the vehicle 2 may be a railway vehicle, an automatic guided vehicle (AGV), a construction machine, or the like. The hood of the vehicle 2 includes an engine room of the vehicle 2 and a head portion of the railway vehicle.

According to at least one embodiment described above, a solar cell system and a vehicle system, in which a pedestrian is protected from an electric shock at the time of vehicle collision, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Examples of the solar cell system and a vehicle system derived from the specification are given below.

(1) A solar cell system comprising:
a first solar cell provided on a hood of a vehicle;
a first electric circuit connected to the first solar cell; and a controller configured to electrically connect the first solar cell with the first electric circuit in a case where a traveling speed of the vehicle is less than a first threshold, and electrically disconnect the first solar cell from the first electric circuit in a case where the traveling speed of the vehicle is equal to or greater than the first threshold.

(2) The solar cell system of (1), further comprising:
a second solar cell provided on at least one of a roof or a back door of the vehicle; and
a second electric circuit connected to the second solar cell, wherein the controller is configured to:
electrically connect the second solar cell with the second electric circuit in a case where the traveling speed of the vehicle is less than the first threshold, and
electrically disconnect the second solar cell from the second electric circuit in a case where the traveling speed of the vehicle is equal to or greater than the first threshold.

(3) The solar cell system of (1) or (2), further comprising:
a third solar cell provided on a dashboard of the vehicle; and
a third electric circuit connected to the third solar cell, wherein the controller is configured to:
electrically disconnect the third solar cell from the third electric circuit in a case where an occupant exists in the vehicle when the vehicle is stopped, and electrically connect the third solar cell with the third electric circuit in a case where the occupant does not exist in the vehicle when the vehicle is stopped.

(4) The solar cell system of any one of (1) to (3), wherein the first solar cell is a single-layer solar cell or a tandem solar cell.

(5) The solar cell system of any one of (1) to (4), wherein the first solar cell is a tandem solar cell including a top cell and a bottom cell, and
the controller is configured to:
electrically connect both the top cell and the bottom cell with the first electric circuit corresponding to each cell in a case where the traveling speed of the vehicle is less than the first threshold, and
electrically disconnect the top cell from a corresponding first electric circuit and electrically connect the bottom cell with the corresponding first electric circuit in a case where the traveling speed of the vehicle is equal to or greater than the first threshold.

(6) The solar cell system of any one of (1) to (5), wherein the controller is configured to electrically disconnect the first solar cell from the first electric circuit regardless of the traveling speed of the vehicle in a case where there is precipitation.

(7) The solar cell system of any one of (1) to (6), wherein the controller is configured to:
electrically disconnect the first solar cell from the first electric circuit in a case where a second threshold greater than the first threshold is provided as a threshold related to the traveling speed of the vehicle and the traveling speed of the vehicle is equal to or greater than the first threshold and less than the second threshold, and
electrically connect the first solar cell with the first electric circuit in a case where the traveling speed of the vehicle is equal to or greater than the second threshold.

(8) The solar cell system of any one of (1) to (7), wherein the first solar cell is a tandem solar cell including a top cell and a bottom cell, and the top cell and the bottom cell are bonded via an insulating adhesive film.

(9) The solar cell system of any one of (1) to (8), wherein the first electric circuit is wirelessly connected to a driving battery provided in the vehicle.

(10) The solar cell system of any one of (1) to (9), wherein the first solar cell is a tandem solar cell including a top cell and a bottom cell,
the first electric circuit corresponding to the top cell is connected to a first battery provided in the vehicle and having a first voltage, and
the first electric circuit corresponding to the bottom cell is connected to a second battery provided in the vehicle and having a second voltage different from the first voltage.

(11) The solar cell system of any one of (1) to (10), wherein
the controller is configured to electrically disconnect the first solar cell from the first electric circuit regardless of the traveling speed of the vehicle in a case of detecting collision of the vehicle.

(12) The solar cell system of any one of (1) to (11), wherein
the first solar cell includes a plurality of strings including a plurality of solar cells, and
the controller is configured to:
connect the strings in parallel in a case where an occupant exists in the vehicle, and
connect the strings in series in a case where the occupant does not exist in the vehicle.

(13) A vehicle system comprising:
a vehicle;
a vehicle speed sensor capable of measuring a traveling speed of the vehicle;
a first solar cell provided on a hood of the vehicle; a first electric circuit connected to the first solar cell; and
a controller configured to electrically connect the first solar cell with the first electric circuit in a case where the traveling speed of the vehicle, which is measured by the vehicle speed sensor, is less than a first threshold, and electrically disconnect the first solar cell from the first electric circuit in a case where the traveling speed of the vehicle, which is measured by the vehicle speed sensor, is equal to or greater than the first threshold.

What is claimed is:

1. A solar cell system comprising:
a first solar cell provided on a hood of a vehicle;
a first electric circuit connected to the first solar cell; and
a controller configured to electrically connect the first solar cell with the first electric circuit in a case where a traveling speed of the vehicle is less than a first threshold, and to electrically disconnect the first solar cell from the first electric circuit in a case where the traveling speed of the vehicle is equal to or greater than the first threshold,
wherein the controller is configured to electrically disconnect the first solar cell from the first electric circuit regardless of the traveling speed of the vehicle in a case where there is precipitation.

2. A solar cell system comprising:
a first solar cell provided on a hood of a vehicle;
a first electric circuit connected to the first solar cell; and
a controller configured to electrically connect the first solar cell with the first electric circuit in a case where a traveling speed of the vehicle is less than a first threshold, and to electrically disconnect the first solar cell from the first electric circuit in a case where the traveling speed of the vehicle is equal to or greater than the first threshold, wherein the controller is configured to:
electrically disconnect the first solar cell from the first electric circuit in a case where a second threshold greater than the first threshold is provided as a threshold related to the traveling speed of the vehicle and the traveling speed of the vehicle is equal to or greater than the first threshold and less than the second threshold, and electrically connect the first solar cell with the first electric circuit in a case where the traveling speed of the vehicle is equal to or greater than the second threshold.

3. A solar cell system comprising:
a first solar cell provided on a hood of a vehicle;
a first electric circuit connected to the first solar cell; and
a controller configured to electrically connect the first solar cell with the first electric circuit in a case where a traveling speed of the vehicle is less than a first threshold, and to electrically disconnect the first solar cell from the first electric circuit in a case where the traveling speed of the vehicle is equal to or greater than the first threshold, wherein:
the first solar cell is a tandem solar cell including a top cell and a bottom cell,
the first electric circuit corresponding to the top cell is connected to a first battery provided in the vehicle and having a first voltage, and
the first electric circuit corresponding to the bottom cell is connected to a second battery provided in the vehicle and having a second voltage different from the first voltage.

4. A solar cell system comprising:
a first solar cell provided on a hood of a vehicle;
a first electric circuit connected to the first solar cell; and
a controller configured to electrically connect the first solar cell with the first electric circuit in a case where a traveling speed of the vehicle is less than a first threshold, and to electrically disconnect the first solar cell from the first electric circuit in a case where the traveling speed of the vehicle is equal to or greater than the first threshold, wherein the controller is configured to electrically disconnect the first solar cell from the first electric circuit regardless of the traveling speed of the vehicle in a case of detecting collision of the vehicle.

5. A solar cell system comprising:
a first solar cell provided on a hood of a vehicle;
a first electric circuit connected to the first solar cell; and
a controller configured to electrically connect the first solar cell with the first electric circuit in a case where a traveling speed of the vehicle is less than a first threshold, and to electrically disconnect the first solar cell from the first electric circuit in a case where the traveling speed of the vehicle is equal to or greater than the first threshold, wherein:
the first solar cell includes a plurality of strings including a plurality of solar cells, and
the controller is configured to:
connect the strings in parallel in a case where an occupant exists in the vehicle, and
connect the strings in series in a case where the occupant does not exist in the vehicle.

6. A vehicle system comprising:
a vehicle;
a vehicle speed sensor configured to measure a traveling speed of the vehicle;
a first solar cell provided on a hood of the vehicle;
a first electric circuit connected to the first solar cell; and
a controller configured to electrically connect the first solar cell with the first electric circuit in a case where the traveling speed of the vehicle, which is measured by the vehicle speed sensor, is less than a first threshold, and to electrically disconnect the first solar cell from the first electric circuit in a case where the traveling speed of the vehicle, which is measured by the vehicle speed sensor, is equal to or greater than the first threshold, wherein the controller is configured to electrically disconnect the first solar cell from the first electric circuit regardless of the traveling speed of the vehicle in a case where there is precipitation.

7. A solar cell system comprising:
a first solar cell provided on a hood of a vehicle;
a first electric circuit connected to the first solar cell; and
a controller configured to electrically connect the first solar cell with the first electric circuit in a case where a traveling speed of the vehicle is less than a first threshold, and to electrically disconnect the first solar cell from the first electric circuit in a case where the traveling speed of the vehicle is equal to or greater than the first threshold, wherein:
the first solar cell is a tandem solar cell including a top cell and a bottom cell, and
the controller is configured to:
electrically connect both the top cell and the bottom cell with the first electric circuit corresponding to each cell in a case where the traveling speed of the vehicle is less than the first threshold, and
electrically disconnect the top cell from a corresponding first electric circuit and electrically connect the bottom cell with the corresponding first electric circuit in a case where the traveling speed of the vehicle is equal to or greater than the first threshold.

8. A solar cell system comprising:
a first solar cell provided on a hood of a vehicle;
a first electric circuit connected to the first solar cell; and
a controller configured to electrically connect the first solar cell with the first electric circuit in a case where a traveling speed of the vehicle is less than a first threshold, and to electrically disconnect the first solar cell from the first electric circuit in a case where the traveling speed of the vehicle is equal to or greater than the first threshold, wherein:
the first solar cell is a tandem solar cell including a top cell and a bottom cell, and
the top cell and the bottom cell are bonded via an insulating adhesive film.

* * * * *